United States Patent [19]

Termine et al.

[11] Patent Number: 4,780,496

[45] Date of Patent: Oct. 25, 1988

[54] FLAME RETARDANT THERMOPLASTIC POLYOLEFIN COMPOSITIONS

[75] Inventors: Enrico J. Termine, West Lafayette; Harry A. Hodgen, Battleground, both of Ind.

[73] Assignee: Great Lakes Chemical Corporation, West Lafayette, Ind.

[21] Appl. No.: 73,595

[22] Filed: Jul. 14, 1987

[51] Int. Cl.[4] .............................................. C08K 5/06
[52] U.S. Cl. .................................... 524/373; 524/412; 524/467
[58] Field of Search ................. 521/88, 146; 524/373, 524/467, 412

[56] References Cited

U.S. PATENT DOCUMENTS

| | | | |
|---|---|---|---|
| 3,849,371 | 11/1974 | Wolford | 524/467 |
| 4,016,137 | 4/1977 | Anderson et al. | 524/373 |
| 4,032,507 | 6/1977 | Anderson | 524/373 |
| 4,038,248 | 7/1977 | Anderson | 524/373 |
| 4,086,192 | 4/1978 | Raley | 524/467 |
| 4,301,058 | 11/1981 | Neukirchen et al. | 524/467 |

FOREIGN PATENT DOCUMENTS 56-18635  2/1981  Japan.

*Primary Examiner*—Veronica P. Hoke
*Attorney, Agent, or Firm*—Kirkland & Ellis

[57] ABSTRACT

Normally combustible thermoplastic polyolefins such as polystyrene and polypropylene may be flame retarded without discoloration utilizing a flame retardant additive mixture comprising hexabromocyclododecane and one or more bis-(polybromophenoxy)ethane.

11 Claims, No Drawings

FLAME RETARDANT THERMOPLASTIC POLYOLEFIN COMPOSITIONS

BACKGROUND OF THE INVENTION

1. Field of the Invention

The present invention relates to thermoplastic polyolefin compositions which are flame retardant and which resist discoloration. More particularly, the invention relates to polystyrene and polypropylene thermoplastic polymers incorporating mixtures of hexabromocyclododecane and one or more bis-(polybromophenoxy)ethane which achieve a V-2 rating according to the UL-94 test and which resist discoloration at processing temperatures.

2. Description of the Prior Art

It is known in the art that polyolefins such as polystyrene, polypropylene homopolymer, and the like can be flame retarded with bromine-containing compounds. Among the flame retardant agents used in such compositions are hexabromocyclododecane, tetrabromobisphenol A, tetrabromobisphenol A bis-(dibromopropyl ether), bis-(tribromophenoxyethyl)tetrabromobisphenol A ether, octabromodiphenyl ether, decabromodiphenyl ether, bis-(tribromophenoxy)ethane, bis-(pentabromophenoxy)ethane, bis-(dibromopropyl carbonate) of tetrabromobisphenol A, and the like. For the most part, these flame retardant agents are used in sufficient quantity so that a rating of V-O is attained in the UL-94 test.

It is also well known that, for flame retarding polyolefins, aliphatic or alicyclic bromine-containing compounds are more effective than aromatic compunds (see J. Hoseczy, Soc. Plat. Eng., Tech. Pap., 20, 379-81). Certain applications, for example portable electronic devices, require a V-2 rating. For an effective V-2 formulation, the stability of the bromine compound and the extent of dripping during burning must be carefully balanced, taking into account the complex interaction of polymer substrate and bromine-containing compound (see C. Jarvis, Org. Coat. Plast. Chem., 43, 181-8). It is well known that polyolefin compositions which contain low concentrations of aliphatic or alicyclic bromine compounds, particularly hexabromocyclododecane, can achieve a V-2 rating (see J. Green, in Flame Retardants, Proc. Int. Symp., 1974, 68-77).

Although it has thus been proposed to incorporate various bromine-containing compounds, especially aliphatic bromine-containing compounds such as hexabromocyclododecane, in polyolefins that must meet V-2 standards, the compositions so obtained have a tendency to degrade on heating or during processing. For example, when such compositions are injection molded, the degradation normally results in severe discoloration of the composition.

In order to avoid polymer degradation problems, stabilizers have commonly been used to retard deterioration of the polymer arising from decomposition of the bromine-containing compounds or from interaction between the polymer and the bromine-containing compounds. Prior art disclosing the use of such stabilizers in polyolefins includes U.S. Pat. No. 4,089,912; Japanese Pat. Nos. 61-106,641; 61-57,636; 60-139,734; 56,145,939; and German Pat. No. 3,402,539 and a variety of others.

However, the use of such stabilizers in accordance with the prior art disturbs the drip/burn balance needed for V-2 formulations and increases the cost of V-2 rated polyolefin compositions. It is therefore desirable to have a V-2 flame retardant polyolefin composition which is resistant to discoloration yet which does not require incorporation of additives other than bromine-containing flame retardant.

Accordingly, a primary object of the present invention is to provide a flame retardant additive mixture capable of providing UL-94 V-2 thermoplastic polyolefin compositions.

A further object is to provide a flame retardant additive mixture of the character described that is especially useful in flame retarding normally combustible polystyrene and polypropylene.

A still further object is to provide a flame retardant additive mixture of the character described comprising agents which, when incorporated individually, do not permit a V-2 rating to be achieved.

Yet a further object is to provide a flame retardant additive mixture of the character described which allows the successful flame retarding of thermoplastic polyolefin compositions which resist discoloration without the use of additional stabilizers or other additives.

SUMMARY OF THE INVENTION

The foregoing and other objects, advantages, and features of the present invention may be achieved by incorporating in normally combustible thermoplastic polyolefin compositions an effective amount, preferably about 2-20 percent by weight, of a flame retardant additive mixture comprising hexabromocyclododecane ("HBCD") and at least one bis-(polybromophenoxy)ethane wherein the weight ratio of HBCD is bis-(polybromophenoxy)ethane preferably lies between 0.1 and 19. The bis-(polybromophenoxy)ethane that may be used in accordance with this invention may include bis-(tribromophenoxy)ethane ("BTBPE"), bis-(tetrabromophenoxy)ethane ("BTTBPE"), bis-(pentabromophenoxy)ethane ("BPBPE"), or mixtures thereof. Thermoplastic polyolefin compositions flame retarded in the foregoing manner meet the UL-94 V-2 standard without discoloration and without using other stabilizing additives.

DESCRIPTION OF THE PREFERRED EMBODIMENTS

In accordance with the present invention, normally combustible polyolefins may be rendered UL-94 V-2 flame retardant without using additional stabilizing additives. Polyolefins which may be treated in accordance with the invention include thermoplastics such as polystyrene, polypropylene, polyethylene, polybutylene. Polystyrene and polypropylene are preferred polyolefins in accordance with this invention.

The polystyrene may be any thermoplastic polystyrene, especially impact modified grades, as described in Modern Plastics Encyclopedia, Vol. 63, No. 10A, 74 (1986). Preferably, the additives of this invention are used with impact grades classified by notched impact values between 0.6 and 3.0 ft-lb/in, and most preferably between 1.0 and 2.5 ft-lb/in.

The polypropylene may be any thermoplastic polypropylene, especially homopolymer type, as described in Modern Plastics Encyclopedia, Vol. 63, No., 10A, 72 (1986). Preferably, the additives of this invention are used with grades classified by melt flows between 2 and 30 g/10 min, and most preferably between 4 and 10 g/10 min.

The flame retardant additive of this invention comprises a mixture of hexabromocycododecane ("HBCD") and at least one bis-(polybromophenoxy)ethane. The HBCD may include any of the isomers resulting from the bromination of isomeric cyclododecatrienes, preferably 1,2,5,6,9,10-hexabromocyclododecane.

The bis-(polybromophenoxy)ethane may be one or more of bis-(tribromophenoxy)ethane ("BTBPE"), bis-(tetrabromophenoxy)ethane ("BTTBPE"), and bis-(pentabromophenoxy)ethane ("BPBPE"). The BTBPE is preferably bis-(2,4,6-tribomophenoxy)ethane, and most especially 1,2-bis-(2,4,6-tribromophenoxy)ethane. The BTTBPE is preferably bis-(2,3,5,6-tetrabromophenoxy)ethane. The BTTBPE employed in accordance with this invention may be methyl substituted, preferably at the 4 position. Thus, 1,2-bis-(2,3,5,6-tetrabromo-4-methylphenoxy)ethane may also utilized.

The BTBPE, BTTBPE, and BPBPE may be used alone or as mixtures of any two or all three of such compounds. Where such mixtures are employed, substantially any combinations of amounts and proportions of the individual compounds may be used. The use of BTBPE is especially preferred in accordance with this invention.

The flame retardant additive mixture utilizes HBCD and bis-(polybromophenoxy)ethane in a weight ratio of about 0.1 to 19, most preferably, about 0.2 to 3.3 where the additive mixture incorporates BTBPE and about 0.4 to 3.3 where the additive mixture incorporates other bis-(polybromophenoxy)ethanes. The mixture of HBCD and bis-(polybromophenoxy)ethane is incorporated into the polyolefin polymer composition preferably at a level of about 2 and 20 percent by weight, and most preferably between 4 and 10 percent by weight.

Practice of the present invention is illustrated by the following examples.

PREPARATION OF POLYSTYRENE COMPOSITIONS

A flame retardant polystyrene composition may be prepared by blending HBCD (1.2 parts), bis-(polybromophenoxy)ethane (4.0 parts) and polystyrene (94.8 parts). The polystyrene utilized was PS-3037 supplied by Huntsman Chemical Corporation.

The resultant mixture is blended in a Brabender PrepCenter mixer (Model R6, C. W. Brabender Instruments, Inc., S. Hackensack, N.J.) at 200° C. until a homogeneous mass develops. The admixture is cooled, ground into chips, and molded into test specimens in a one-ounce Newbury Injection Molder (Model HI-30 RS, Newbury Industries, Inc., Newbury, OH). Conditions for injection molding are given in Table I.

TABLE I

| INJECTION MOLDING MACHINE PARAMETERS | |
|---|---|
| Stock Temperature | 430° F. |
| Mold Temperature | 75° F. |
| Initial Ram Pressure | 1900 psi |
| Secondary Ram Pressure | 1000 psi |
| Initial Injection Time | 5 sec |
| Total Injection Time | 10 sec |
| Cycle Time | 25 sec |

FLAME RETARDANCE

Flame retardance of polystyrene test specimens formulated for the foregoing manner was determined utilizing the Underwriters Laboratories procedure UL-94.

EVALUATION OF COLOR DEVELOPMENT

Polystyrene compositions were prepared as described above except that a Brabender Plasticorder mixer (Model PL-V300) was used. The formulations were mixed for 30 minutes at 230° C. and 50 rpm. The homogeneous mass was sampled at 3 minute intervals, and visual observations of the appearance of the polymer compositions were made.

EXAMPLES TO ILLUSTRATE INVENTION

Examples 1–8

The foregoing techniques were used to prepare a series of polystyrene samples containing HBCD and/or BTBPE at various ratios and additive mixture loading levels. Examples 1–3 contained both HBCD and BTBPE at HBCD/BTBPE ratios of 0.30, 1.00, and 3.30, respectively. Examples 4 and 5 contained only HBCD and Examples 6 and 7 contained only BTPBE. Example 8 contains HBCD and BTBPE at a ratio of 0.43. Each of the samples was evaluated for flame retardancy utilizing the UL-94 test, and each was observed for the extent of discoloration during formulation. The composition and test data are reported in Table II.

TABLE II

| Example No. | Ratio HBCD/BTBPE | Loading Fr Add've | UL-94 Rating | Extent of Discoloration[1] |
|---|---|---|---|---|
| 1 | 0.30 | 6.0 | V-2 | 1 |
| 2 | 1.00 | 6.0 | V-2 | 3 |
| 3 | 3.30 | 6.0 | V-2 | 3 |
| 4 | —[2] | 6.0 | V-2 | 5 |
| 5 | —[2] | 1.4 | FAIL | 2 |
| 6 | 0.00 | 4.6 | FAIL | 1 |
| 7 | 0.00 | 6.0 | FAIL | 1 |
| 8 | 0.43 | 5.2 | V-2 | 1 |

[1]Defined as 1 having the best color retention, and 5 having the worst color retention.
[2]Contains only HBCD.

The data reported in Table II support the following conclusions:

Example 1 illustrates the preferred mixture of HBCD and BTBPE that achieves a V-2 rating with minimal discoloration.

Examples 2, 3 and 8 illustrate other ratios of HBCD and BTPBE within the scope of this invention that are useful in making a composition with a V-2 rating and minimal discoloration.

Example 4 is a comparative example illustrating what happens when HBCD alone is used as the only bromine-containing additive. Examples 1–3 and 8 are marked improvements over Example 4, which exhibits serious discoloration.

Example 5 illustrates that when less HBCD is used, better color than Examples 2 and 3 can be achieved. However, Example 5 is not a useful formulation, since it fails the UL-94 test.

Examples 6 and 7 illustrate that BTPBE alone is not sufficient to pass the UL-94 test.

Examples 5 and 6 illustrate that when compositions are prepared based on flame retardant loadings of HBCD or BTBPE in Example 1, neither HBCD or BTPBE, when incorporated individually and as the sole bromine-containing additive, attain a V-2 rating.

Examples 1 through 8 illustrate that there is a surprising and synergistic relationship between HBCD and BTBPE. The combination of HBCD and BTBPE yields a composition that achieves a V-2 rating and resists discoloration which neither bromine-containing material alone can do.

Example 9

Polystyrene samples were prepared in the foregoing manner incorporating a mixture of HBCD and BPBPE in a weight ratio of 0.43 and at loading levels of 5.2 and 6 percent by weight. The samples were evaluated for flame retardancy utilizing the UL-94 test and were observed for the extent of discoloration during formulation. Each sample achieved a V-2 flame retardancy rating and the extent of discoloration of each was a 1 on the scale used in Table II. Example 9 thus demonstrates the successful practice of the present invention using a mixture of HBCD and BPBPE at two loading levels.

Examples 10-13

A series of additional polystyrene test samples were prepared in the foregoing manner incorporating 1.2 percent HBCD and varying percentages of other bromine-containing flame retardants such as bis-(tribromophenoxyethyl ether) of tetrabromobisphenol-A and tetrabromobisphenol-A dipropionate. UL-94 flame retardancy data and discoloration data are reported in Table III.

TABLE III

| Example No. | HBCD Wt % | Other Br—Additive (Type) | Other Br—Additive Wt % | UL-94 | Comparison of Color to Ex. 1 |
|---|---|---|---|---|---|
| 10 | 1.2 | BE-62[1] | 4.0 | Fail | Similar |
| 11 | 1.2 | BE-62[1] | 4.5 | Fail | Similar |
| 12 | 1.2 | TBBPA[2] | 5.0 | V-2 | Worse |
| 13 | 1.2 | TBBPA-DP[3] | 5.0 | Fail | Similar |

[1]Bis(tribromophenoxyethyl ether) of tetrabromobisphenol A available from Great Lakes Chemical Corporation.
[2]Tetrabromobisphenol A.
[3]Tetrabromobisphenol A dipropionate.

The data reported in Table III support the following conclusions:

Example 10 illustrates that when an aromatic bromine-containing compound of similiar structure to BTBPE is substituted for BTBPE on a weight basis, the resultant composition fails the UL-94 test. Therefore, these results suggest that the combination of a thermally stable aromatic bromine-containing material and HBCD will not give a useful composition. Example 11 illustrates that when comparing compositions of equivalent bromine concentrations, the same results are achieved as in Example 10.

Examples 12 and 13 address other bromine-containing additives and interactions with polymer melt flow. Examples 12 and 13 have higher melt flows than Example 1. Example 12 achieves a V-2, but does not resist color development, and Example 13 resists color development, but fails the UL-94 test.

Examples 10 through 13 demonstrate that the mixture of HBCD and BTBPE is a unique mixture and that the present invention is not obvious on the basis of polymer melt flow.

Example 14

A further test specimen utilizing the flame retardant additive mixture of this invention and incorporating a hydrotalcite-compound, DHT4-A, available from Kyowa Chemical Industry Co., Ltd., was formulated. The UL-94 and discoloration results are reported in Table IV.

TABLE IV

| Example No. | Ratio HBCD/BTBPE | Loading FR Additive | Other Additives | Wt % | UL-94 | Comparison of Color to Ex. 1 |
|---|---|---|---|---|---|---|
| 14 | 0.30 | 6.0 | DHT4-A | 0.2 | Fail | Similar |

Example 14 illustrates that when other additives, such as stabilizers, are used, the resultant composition is not useful since it fails the UL-94 test.

PREPARATION OF POLYPROPYLENE COMPOSITIONS

Flame retardant polypropylene compositions were prepared according to the procedure outlined for polystyrene compositions, except that polypropylene available from Himont Incorporated as Himont 6534 was used.

Examples 15-17

Flame retarded polypropylene compositions were prepared in the foregoing manner containing HBCD and/or BTBPE in the amounts shown in Table V. UL-94 flame retardancy data and coloration data are given in Table V. The data in Table V demonstrate that only Example 15, polypropylene incorporating 5.0 weight percent of the invention mixture, achieved UL-94 V2 flame retardancy without discoloration. HBCD and BTBPE used alone each failed either the UL 94 or the coloration test.

TABLE V

| Example No. | Ratio HBCD/BTBPE | Loading Fr Add've Wt % | UL-94 | Extent of Discoloration[1] |
|---|---|---|---|---|
| 15 | 0.30 | 5.0 | V-2 | 1 |
| 16 | —[2] | 5.0 | V-2 | 5 |
| 17 | 0.00 | 5.0 | Fails | 1 |

[1]Defined as 1 having the best color retention and 5 having the worst color retention.
[2]Contain only HBCD.

We claim:
1. Flame retarded thermoplastic polyolefin compositions that are resistant to thermal discoloration comprising:
 a normally combustible thermoplastic polyolefin; and
 an effective amount of a flame retardant additive mixture comprising hexabromocyclododecane and at least one bis-(polybromophenoxy)ethane, with the weight ratio of hexabromocyclododecane to bis-(polybromophenoxy)ethane lying in the range of about 0.1-19,
 wherein the flame retarded polyolefin composition is resistant to thermal discoloration without incorporation of thermal stabilizing additives and has a V-2 UL-94 flame retardant capability.
2. A composition, as claimed in claim 1, wherein the flame retardant additive mixture is provided at a level of about 2-20 percent by weight of the composition.
3. A composition, as claimed in claim 1, wherein the polyolefin is polystyrene.

4. A composition, as claimed in claim 1, wherein the polyolefin is polypropylene.

5. A composition, as claimed in claim 2, wherein the flame retardant additive mixture is present at a level of about 4–10 percent by weight of the composition.

6. A composition, as claimed in claim 1, wherein the weight ratio of hexabromocyclododecane to bis-(polybromophenoxy)ethane lies in the range of about 0.2–3.3.

7. A composition, as claimed in claim 1, wherein the hexabromocyclododecane is 1,2,5,6,9,10-hexabromocyclododecane.

8. A composition, as claimed in claim 1, wherein the bis-(polybromophenoxy)ethane is a member selected from the group consisting of bis-(tribromophenoxy)ethane, bis-(tetrabromophenoxy)ethane, bis-(tetrabromomethylphenoxy)ethane, bis(pentabromophenoxy)ethane and mixtures thereof.

9. A composition, as claimed in claim 8, wherein the bis-(polybromophenoxy)ethane is 1,2-bis-(2,4,6-tribromophenoxy)ethane.

10. A composition, as claimed in claim 8, wherein the bis-(polybromophenoxy)ethane is 1,2-bis-(2,3,5,6-tetrabromo-4-methylphenoxy)ethane.

11. A composition, as claimed in claim 8, wherein the bis-(polybromophenoxy)ethane is 1,2-bis-(pentabromophenoxy)ethane.

* * * * *